United States Patent
Harris

(10) Patent No.: US 8,930,656 B2
(45) Date of Patent: Jan. 6, 2015

(54) STORAGE DEVICE WITH WIRELESS CAPABILITY

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 943 days.

(21) Appl. No.: 13/046,152

(22) Filed: Mar. 11, 2011

(65) Prior Publication Data

US 2011/0252182 A1  Oct. 13, 2011

Related U.S. Application Data

(60) Provisional application No. 61/322,827, filed on Apr. 10, 2010.

(51) Int. Cl.
*G06F 12/00* (2006.01)
*G06F 21/78* (2013.01)
*G11C 16/22* (2006.01)

(52) U.S. Cl.
CPC ............. *G06F 21/78* (2013.01); *G11C 16/22* (2013.01)
USPC ........................................... 711/163

(58) Field of Classification Search
None
See application file for complete search history.

(56) References Cited

U.S. PATENT DOCUMENTS

| | | | |
|---|---|---|---|
| 7,889,181 B2* | 2/2011 | Bi et al. | 345/169 |
| 2006/0208066 A1* | 9/2006 | Finn et al. | 235/380 |
| 2011/0066777 A1* | 3/2011 | Della Pia et al. | 710/106 |

* cited by examiner

*Primary Examiner* — Brian Peugh
(74) *Attorney, Agent, or Firm* — Law Office of Scott C. Harris, Inc.

(57) ABSTRACT

Wireless USB device with security that allows the information to be automatically exchanged with the USB device wirelessly when it is in one location, and when in another location, only certain information can be so exchanged.

16 Claims, 6 Drawing Sheets

STORAGE DEVICE WITH WIRELESS CAPABILITY

This application claims priority from provisional application No. 61/322,827, filed Apr. 10, 2010, the entire disclosure of which is hereby incorporated by reference.

BACKGROUND

U.S. Pat. No. 6,298,322 describes a system of using a computer readable device as an electronic tag for an item. According to this patent, the computer readable medium can be used as a tag, later removed, and placed into a computer.

Many different kinds of computer readable media are known. For example, USB flash drives have achieved wide acceptance as a computer readable medium that because they allowed read and write access. The price of nonvolatile "flash" memory has made it possible to provide inexpensive storage media of this type.

SUMMARY

Embodiments describe new forms of computer readable media that are readable in a wireless manner.

DETAILED DESCRIPTION

It has been found that electronic tags which require connection to the user's computers are actually used by a very small fraction of the total number of users. Therefore, while these devices operate as a tag, they often do not carry out the advertising functions intended by their owners.

Wireless power is also known, and there are many forms of wireless power which have been used. Inductive wireless power is often used in things like toothbrushes, and relies on a close and exact positioning relationship between the transmitting antenna that sends the power, and the receiving antenna that receives the power. However, magnetic resonance transfer of power is also known, and described in detail on witricity.com, in various MIT papers, as well as in a number of US patent applications including publication number 2007 0222542, as well as a number of patent applications by Nigel Power LLC, including publication number 20090127937, and patent application Ser. No. 12/089,069. Each of these describes ways of transmitting power at a distance using coupled magnetic resonance.

A conventional product may be as shown in U.S. Pat. No. 6,298,332. A label for the product includes an optical disk, e.g., a CD as part of the product. Problems with this, however, include that the public is often worried about what content is on the CD (e.g. malware), and also do not well understand how to use it.

According to an embodiment, a label is formed that communicates wirelessly with a consumer that receives the product, e.g., the purchaser. According to one embodiment, the label may operate in multiple different modes. In a first mode, the label does not communicate at all, or only communicates in a promo mode before purchase. After purchase, either a seal may be broken on the label, or an RF shield removed, or the label activated in some other way which involves physically changing the packaging on the device. In another embodiment, the label may be activated by the point of sale.

Figure 1:
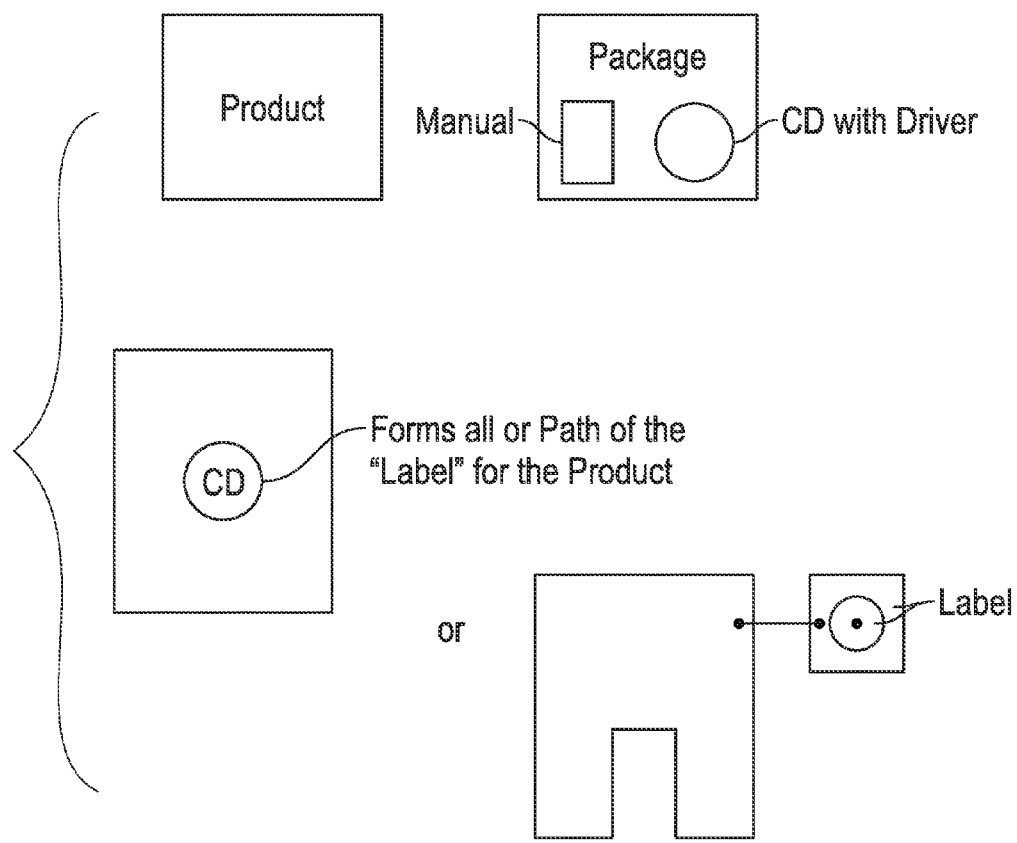
FIGS. 1 and 2A-2D show memory devices attached to a product.

FIGS. 1 and 2A-2D show different embodiments. FIG. 1 shows the label 205 on an item of clothing, e.g, a pair of shorts 200. The label has parts which are held together with a seal 210, e.g., a glued or otherwise attached portion with electrical contacts. The seal is broken after purchase, e.g, when the user removes the tag or breaks the seal 210. This turns on a more aggressive communication mode, for example. The seal 210 may be, for example, an electrical connection, which is broken to indicate that the seal has been broken. In this embodiment, the memory device has a Wifi chip 215, that communicates wirelessly with a receiver.

Figure 2A:
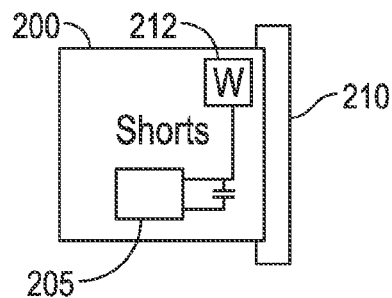

FIG. 2A shows using a wireless power source 212 to drive the WiFi connection or some other connection such as a Bluetooth, Zigbee or Dash7 connection by receiving power wirelessly as in the embodiments described herein, or alternatively. FIG. 2A shows an additional or alternative internal battery 211.

Figure 2B:
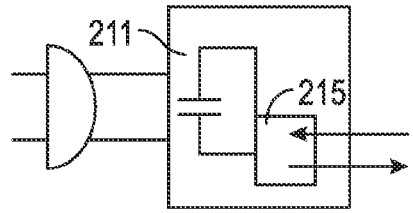
Figure 2C:
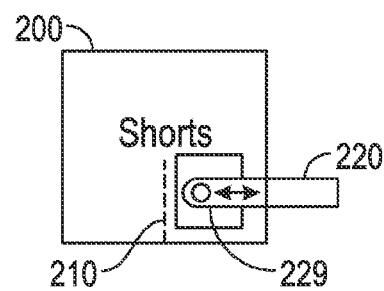

FIG. 2c shows a device with a retractable USB connector 220. The position of the USB connector sets the mode of operation. The USB connector being retracted causes the memory to operate in one mode (e.g., the mode that exists prior to purchase). Extending the usb connector, into a position where it is extended out and pluggable into a usb socket as shown, turns on a different mode, for example a more communicative mode. This may be on clothing 200 as in FIG. 1, and the extending of the USB connector may also break the seal 210 as in the first embodiment.

Figure 2D:
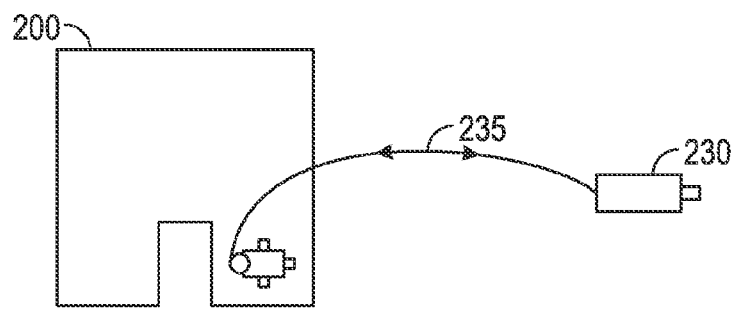

FIG. 2C shows a retractable cable with a clip 229 on the product 200, where the USB device 230 is extended on a tether 235 as shown in FIG. 2D to plug into the computer. This may use any of the techniques of FIG. 1 or 2A-2B.

In one embodiment, the device may have a file structure, which includes a first part of the file structure that is public. This first part is called public contents. Another part of the file structure, outside the public contents folder, is secured contents. In one embodiment, the secured contents can only be accessed when the USB connector is extended or activated according to one of the modes of FIG. 1 or 2A-2B. When the USB connector is retracted, the secured contents cannot be accessed, and only the public contents can be accessed.

Figure 3:
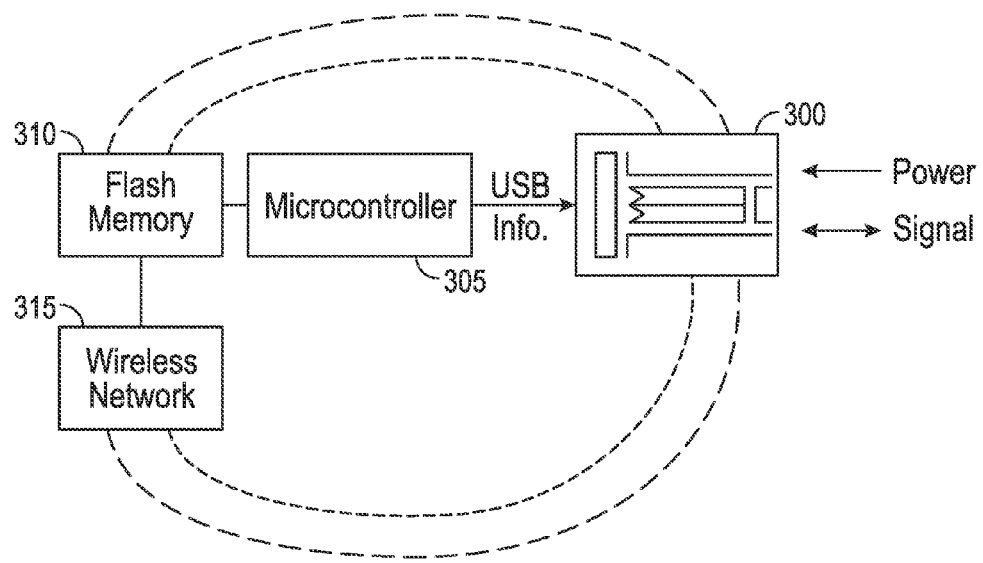
FIG. 3 shows a block diagram of a wireless thumb drive according to the present specification.

Another embodiment shown in FIG. 3 forms a wireless drive which can be used for the purposes in FIGS. 1/2, or for many other purposes. FIG. 3 shows a block diagram of the drive 299, in which the power from the USB connector 300 powers the integrated circuits that form parts of the USB device. FIG. 3 shows the USB connector 300, adapted for connecting to a USB connection and receiving both power and signal therefrom. A first integrated circuit 305 is a microcontroller, optimized for USB operations, e.g, a Freescale Semiconductor 9S12UF32. Flash memory 310, connected to the microcontroller 305, stores the data, and may be any conventional non volatile memory type noted above. In addition, a wireless network device chip 315 has access to the data contents in the memory 310, and connects to a wireless network. Hence, this device both connects to a USB connector, and also connects wirelessly to a wireless network.

Another embodiment may carry out similar operations without the wired USB connector.

The FIG. 3 embodiment may also use the power sources of any of FIGS. 2A-2C.

Figure 4A:
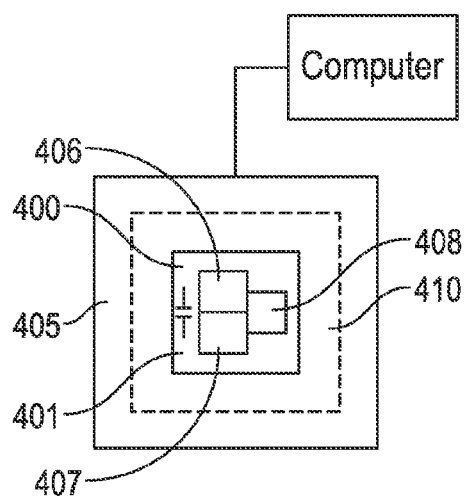
FIGS. 4A-4D shows the thumb drive on a cradle.
Figure 4B:
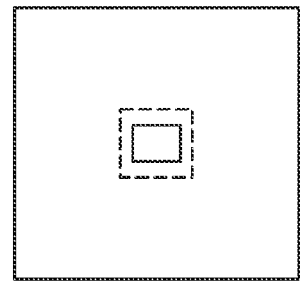
Figure 4C:
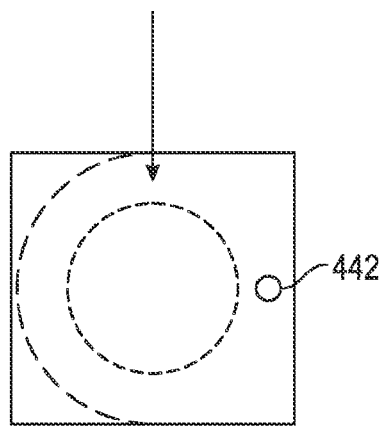

FIG. 4A-4C illustrate different embodiments of communication in connection with the wireless "thumb" drive. This drive may or may not have a USB connector in any of the embodiments. In FIG. 4A, the thumb drive 400 is placed on a cradle 405. Inside the cradle is a nesting part 410. The nesting part 410 has inner surfaces that hold the thumb drive 400. For example, this can be an indentation in the shape of the outer perimeter of the thumb drive 400.

In one embodiment, the thumb drive may have an extendable and retractable connector. FIG. 4A shows the connector extended. FIG. 4A also shows how the driver can include similar parts to those shown in FIG. 3, specifically a Wi-Fi device 406, a flash memory device 407, and a controller 408.

FIG. 4B shows the thumb drive in the nesting part with no connector or with the connector retracted. As shown, the indentation is shaped to hold the main body of the thumb drive. In the specific embodiment shown in FIG. 4B, the thumb drive can be placed in the inner surfaces of the nesting part in multiple different directions within the nesting part. Structure in the nesting part or external structure detect the placement of the thumb drive as a locational parameter indicative of the location of the drive, and determine what access will be allowed based on that detecting that locational parameter.

In one embodiment, when the thumb drive is in the indentation, it is placed in the "right" position to have a locational parameter and to receive an induced wireless power. Hence, the USB drive in that position can be wirelessly charged or powered by electrical power based on its proper positioning. Wireless communication can also be carried out with the thumb drive in that position.

FIG. 4C shows how an antenna 412 on the cradle 405 may be coaxial with an antenna 413 on the thumb drive 410. There is also an LED or other indicator 442 which indicates the locational parameter, e.g., the direction in which the thumb drive 410 has been inserted or that the drive is properly placed on the cradle. These antennas detect the locational parameter in one embodiment.

Figure 4D:
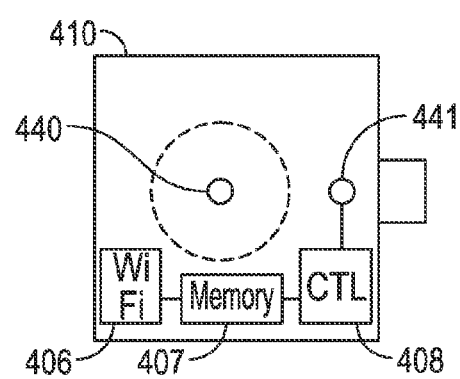

FIG. 4D illustrates the coaxial positioning between the antennas that may optimize the wireless communication.

In these embodiments, the wireless transmission can be via inductive coupling, or via electrodynamic resonant coupling, or via resonant inductive/magnetic charging using non-radiative energy transfer.

Figure 5:
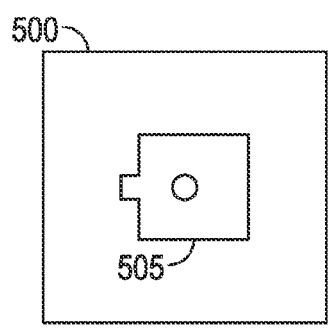
FIGS. 5 and 6 show how the thumb drive can be located in different directions on the cradle.

FIG. 5 shows that when the thumb drive 500 is located in one direction (first locational parameter) the LED 505 may glow amber. In this mode, the data connection may be limited as discussed herein. In an alternative, the first locational parameter, leading to the limited data connection, may occur when the thumb drive 500 is at a distance from the reader as opposed to be on the cradle.

Figure 6:
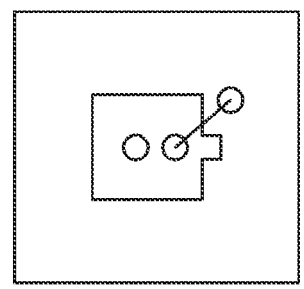

However, when the thumb drive 500 is oriented in the direction shown in FIG. 6, there may be a second locational parameter, the LED may glow green, and full read-write access becomes possible. In the alternative embodiment, the thumb drive being detected to be on the cradle. The direction or presence on the cradle may be detected by supplemental antennas 441 on the USB drive and 442 on the cradle acting as a sensor. There may also be, for example, arrows or electronic indicia on the USB drive showing directions for different actions, e.g., an arrow showing the direction of orientation for full read-write.

In this embodiment, when the locational parameter is sensed to determine that the thumb drive is in the direction shown in FIG. 6, full transfer is allowed. When the thumb drive is in the direction shown in FIG. 5, only some functionality is available. For example, in one embodiment when the thumb drive is not in the full access direction on the wireless reader, only transfers to and from the public information part of the file system may be possible, or the thumb drive 500 may only be read and not written to.

The powering of the device may have an internal battery or capacitor shown as 401. This may allow powering in some limited fashion. In addition, wireless power is presented if the device is not plugged in. The wireless power can be inductive, resonant electrodynamic, or resident inductive/magnetic, using any technique known in the art including those techniques known by Witricity and ecoupled. The thumb drive device also includes a WiFi chip or other low power network, such as Dash7 or some other low power system shown as 406, that carries out the wireless communication with the contents of the memory. The flash memory shown as 407 may be written to and read from using power from the battery 401, or wireless supplied power, or using power supplied over the wired connection when connected directly. A controller 408 controls the operation as described in further detail.

Figure 7A:
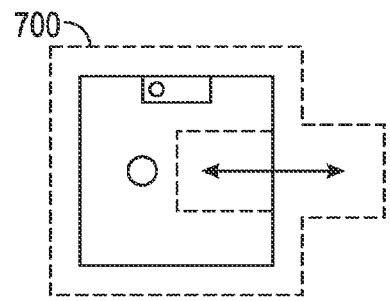
FIG. 7A-7C show retractable cords on a thumb drive.
Figure 7B:
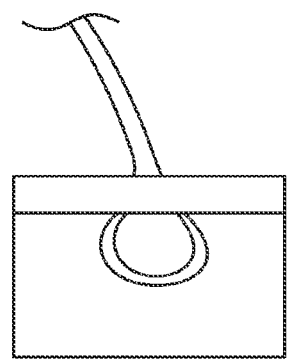
Figure 7C:
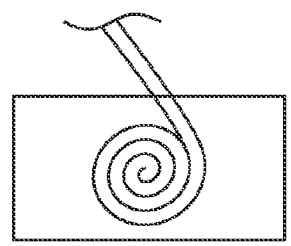

In addition, FIG. 7A illustrates how the thumb device may have a retractable connector 700 for a retractable cord. This may allow the thumb device for example to be worn on a belt, or the like. In one embodiment, this can be tied on to the device as in FIG. 7B. In another embodiment as in FIG. 7C, the cord is retractable into the device itself. For example, there may be a spool of wire, with a spring operated spool as shown. The spring operated spool may also include various stops that allow the spring operation to stop at certain locations and retract in another mode.

Figure 8:
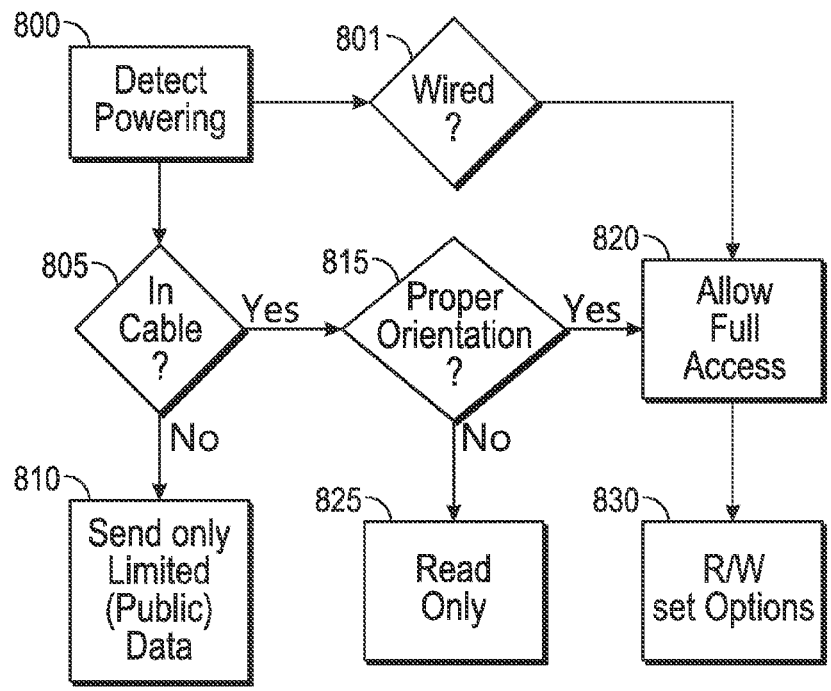
FIG. 8 shows a flowchart of operation of the thumb drive determining its locational position.

According to an embodiment, the controller in the USB device may carry out the flowchart shown in FIG. 8. At 800, the system detects power, by whatever source of power is used. The power can be, for example, over the USB connector, or over any other form of powering such as the wireless power described herein.

At 801, a wire detection is detected, which automatically allows full access to the device, since the user has physically plugged in the device. (In one embodiment, full access may be allowed only after a password is entered). At 805, the system detects whether the USB device is in its cradle, based on wireless powering being detected. If not, at 810, the system operates a mode where only limited (public) data can be sent.

For example, in the embodiment of an electronic tag, the system may send only various advertising information, either in response to a poll, or in response to an indication from some local device about the local device is willing to accept that information.

If the device is determined to be in the cradle at 805, 815 determines if the locational parameter has a specified value, e.g., the device is in a specified operation, called herein "proper". The proper operation may be the orientation shown above that forms a green LED. If the device is in the proper orientation at 815, full access to all contents of the memory contents are also provided. If not, the device may be placed into a read only mode at 825.

At 830, the system allows setting options, and may for example allow setting the option that any locational parameter, e.g, any orientation in the reader, may allow full access. However, it is believed that full access should not be provided to any remote access operation, to prevent a user's contents from being improperly intercepted by some other person or receiver. Therefore, the techniques described herein can be used to allow wireless access to the USB device.

At 805, a detection of whether the device is in the "cradle" is detected.

The wireless technologies described herein may allow applying power at a distance, and in fact may even allow applying the power from as far as 10 feet or more away.

Figure 9:
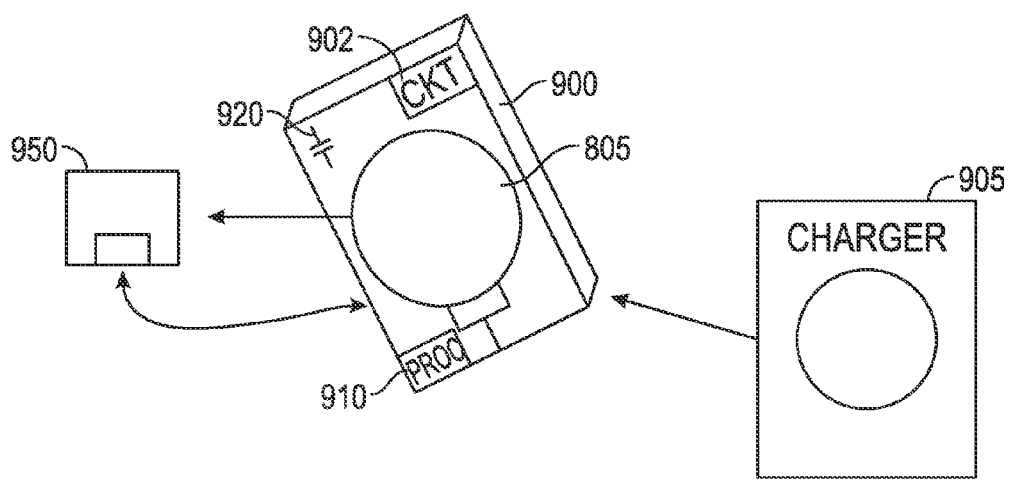
FIG. 9 shows an embodiment with the techniques of the present application applied to a wireless telephone.

FIG. 9 shows another embodiment where a smart phone 900 includes a wireless power circuit 902. Wireless power circuit is coupled to receive information from an antenna system 905. A smart phone may also include, as conventional, a processor 910 which may be used to carry out cellular functions and to carry out other smart functions of the phone. In addition, battery 920 may operate the phone based on stored charge. The battery may also be charged using the wireless power circuit 900 and receiving power from the antenna 905.

According to an embodiment, the wireless power circuit 902 is usable both as a receiving circuit and as a transmitting circuit. In the receiving circuit, the wireless power circuit may receive power from a charging source 925. For example, this may be a room charger or the like. In another mode, however, the battery power as stored may be sent to the circuit 902 which is configured as a transmitting circuit, and the antenna 905 may then become a transmitting antenna which transmits power. The transmitted power may be transmitted for example to a wireless storage device shown as 950, of the types in any previous embodiments. For example, this may use a remote form of power such as described in the above. Once the device 950 receives power from the cell phone, it can establish a short range communication with the phone, e.g. via WiFi, Bluetooth, or the like.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other applications may be possible. In one embodiment, the system may be used, for example, as a personal ID device, or a room access device. In the room access device embodiment, the user could need to know not only, for example, how to use the device, but also what direction the device needed to be configured.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A memory device, comprising:
   a housing;
   a non-volatile memory that stores data, in said housing;
   a wireless communication device, in said housing, in communication with said non-volatile memory and with a wireless network;
   a controller for said non-volatile memory which controls data transfer of said non-volatile memory; and
   a sensor, that senses a locational parameter of said housing;
   wherein said controller is responsive to said locational parameter sensed by said sensor to allow full access to said non-volatile memory only when said housing has a specified locational parameter.

2. A memory device as in claim 1, wherein said locational parameter is a direction in which the device is oriented on a reader.

3. A memory device as in claim 1, wherein said locational parameter is a distance between said housing and a reader.

4. A memory device as in claim 1, wherein said controller allows access to only a portion of contents of said memory device when said housing does not have the specified locational parameter, but allows access to all of the contents of said memory device when said housing does have the specified locational parameter.

5. A memory device as in claim 4, further comprising an indicator that indicates whether the memory device has the specified locational parameter.

6. A memory device as in claim 1, wherein said controller allows access to no contents of said memory when does not have the specified locational parameter.

7. A memory device as in claim 1, wherein said device is initially in a state where access to only less than all contents of said memory device can be obtained, and requires a physical change to a packaging part before access to more t contents of said memory device can be obtained.

8. A memory device as in claim 1, further comprising a wireless power receiver that receives wireless power when said memory device has the specified locational parameter.

9. A memory device as in claim 1, further comprising a connector that connects to a receiver to control data transfer by wire using said connector.

10. A memory device as in claim 9, wherein said connector is retractable.

11. A memory device, comprising:
    a housing;
    a non-volatile memory that stores data, in said housing;
    a wireless communication device, in said housing, in communication with said non-volatile memory and with a wireless network;
    a controller for said non-volatile memory which controls data transfer of said non-volatile memory;
    a wireless power receiver, that wirelessly receives power for operating said memory and said wireless communication device and couples said power to said memory and said wireless communication device, to receive power wirelessly; and
    a sensor, that senses a locational parameter of said housing, and allows full access to said non-volatile memory only when said housing has a specified locational parameter.

12. A memory device as in claim 11, wherein said locational parameter is a direction in which the device is oriented on a reader.

13. A memory device as in claim 11, wherein said locational parameter is a distance between said housing and a reader.

14. A method, comprising:
    using a controller for controlling communication with a non-volatile memory that stores data, in a housing,
    using a wireless communication device that communicates data from said nonvolatile memory with a wireless network; and
    sensing a locational parameter of said housing, and using said controller for allowing full access to said non-volatile memory via said wireless communication device based on said locational parameter, to provide said full access only when said housing has a specified locational parameter.

15. A method as in claim 14, wherein said locational parameter is a direction in which the housing is oriented on a reader.

16. A method as in claim 14, wherein said locational parameter is a distance between said housing and a reader.

* * * * *